US008048295B2

(12) United States Patent
Brown et al.

(10) Patent No.: US 8,048,295 B2
(45) Date of Patent: Nov. 1, 2011

(54) PROCESS FOR DECREASING BROMINE-REACTIVE CONTAMINANTS IN HYDROCARBON FEEDS

(75) Inventors: Stephen H. Brown, Bernardsville, NJ (US); Jose G. Santiesteban, Hellertown, PA (US); Bryson J. Sundberg, Erial, NJ (US); Terry E. Helton, Bethlehem, PA (US); Daria N. Lissy, Glen Mills, PA (US); Jean W. Beeckman, Columbia, MD (US); Arthur P. Werner, Alexandria, VA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/633,971

(22) Filed: Dec. 5, 2006

(65) Prior Publication Data
US 2008/0128329 A1 Jun. 5, 2008

(51) Int. Cl.
*C10G 25/03* (2006.01)

(52) U.S. Cl. ........ 208/300; 208/177; 208/295; 208/299; 208/301; 208/307; 585/258; 585/259; 585/260; 585/264; 585/273; 585/276; 585/323; 585/467; 585/804; 585/809

(58) Field of Classification Search .................. 208/177, 208/295, 299, 301, 307, 300; 585/258, 259, 585/260, 264, 273, 276, 323, 467, 804, 809
See application file for complete search history.

(56) References Cited

U.S. PATENT DOCUMENTS

| | | | |
|---|---|---|---|
| 4,016,218 A | 4/1977 | Haag et al. | |
| 4,328,130 A | 5/1982 | Kyan | |
| 4,441,990 A | 4/1984 | Huang | |
| 4,582,815 A | 4/1986 | Bowes | |
| 4,795,550 A * | 1/1989 | Sachtler et al. | 208/307 |
| 4,872,968 A | 10/1989 | Bowes | |
| 5,146,029 A * | 9/1992 | Bundens et al. | 585/533 |
| 5,336,820 A * | 8/1994 | Owen et al. | 585/323 |
| 5,993,642 A | 11/1999 | Mohr et al. | |
| 6,368,496 B1 | 4/2002 | Brown et al. | |
| 6,500,996 B1 * | 12/2002 | Brown et al. | 585/323 |
| 6,781,023 B2 * | 8/2004 | Brown et al. | 585/276 |

FOREIGN PATENT DOCUMENTS

WO 99/38936 8/1999

OTHER PUBLICATIONS

Chemical Engineer's Handbook, Perry and Chilton, Fifth Edition, McGraw Hill, 1973, p. 4-31.*
Miale et al., "Catalysis by Crystalline Aluminosilicates IV. Attainable Catalytic Cracking Rate Constants, and Superactivity", Journal of Catalysis, (1966), 6, pp. 278-287.

(Continued)

*Primary Examiner* — Prem C Singh
(74) *Attorney, Agent, or Firm* — Andrew B. Griffis

(57) ABSTRACT

A process for reducing the Bromine Index of a hydrocarbon feed containing bromine-reactive contaminants that has improved cycle length and utilizes a crystalline molecular sieve catalyst. The process is carried out by contacting the hydrocarbon feed under conversion conditions with a catalyst shaped in the form of an elongated aggregate comprising a crystalline molecular sieve having a MWW or *BEA framework type. The shortest cross-sectional dimension of the elongated aggregate is less about 1/10 inch (2.54 millimeters).

3 Claims, 1 Drawing Sheet

OTHER PUBLICATIONS

ASTM D2710-92, "Standard Test Method for Bromine Index of Petroleum Hydrocarbons by Electrometric Titration[1]", pp. 1-7, (1994).

Dachos et al., "UOP PLatforming Process", Handbook of Petroleum Refining Processes, 2nd Edition, McGraw-Hill, NY (1996), pp. 4.3-4.26.

* cited by examiner

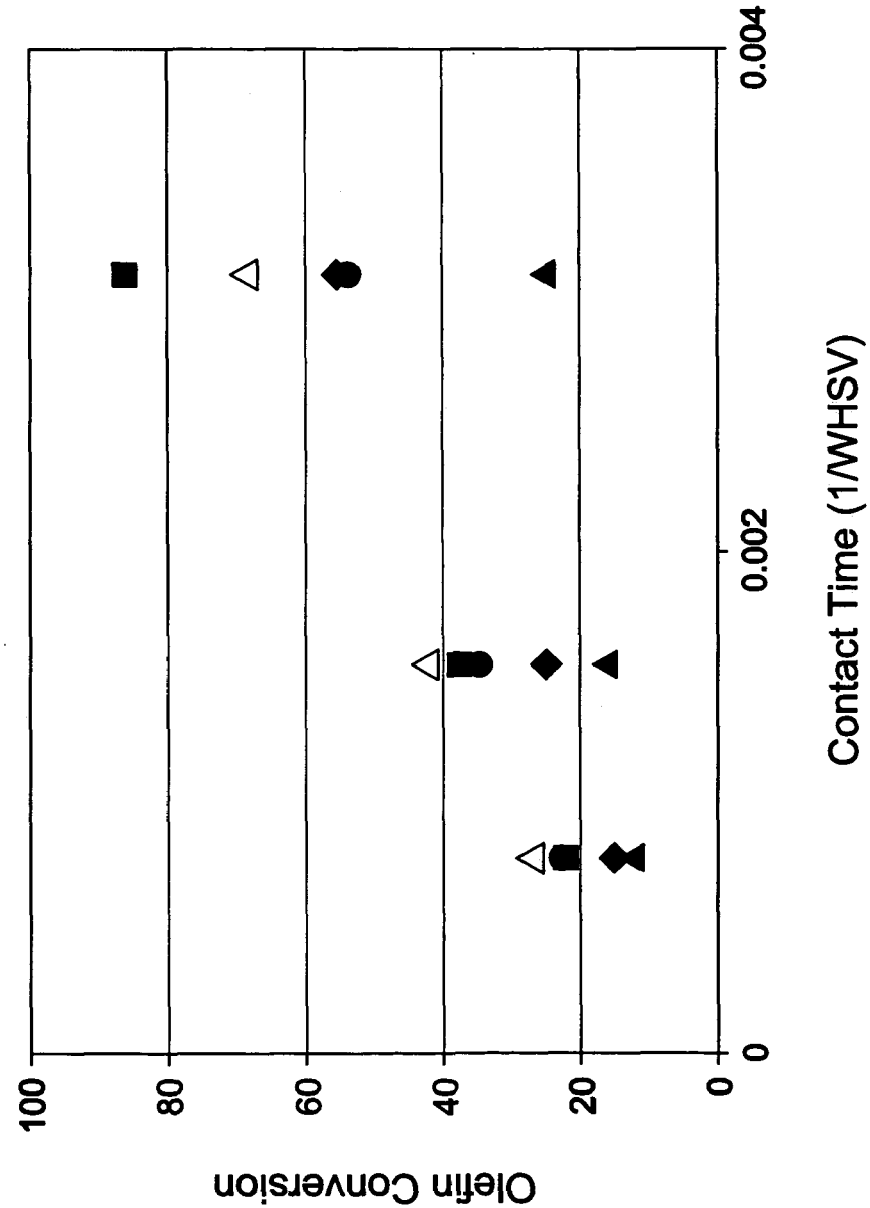

PROCESS FOR DECREASING BROMINE-REACTIVE CONTAMINANTS IN HYDROCARBON FEEDS

BACKGROUND OF THE INVENTION

1. Field of the Invention

The present invention is concerned with decreasing bromine-reactive contaminants in hydrocarbon feeds. More specifically, the present invention is concerned with a process for removing bromine-reactive contaminants from hydrocarbon feeds that has a longer cycle length and utilizes a crystalline molecular sieve catalyst.

2. Description of the Prior Art

Hydrocarbon feeds, such as aromatic hydrocarbon feeds, are derived from processes such as naphtha reforming and thermal cracking (pyrolysis) and can be used as feedstocks in a variety of petrochemical processes, such as para-xylene production from an aromatic hydrocarbon feedstock containing benzene, toluene and xylene (BTX), toluene disproportionation, xylene isomerization, alkylation and transalkylation. However, aromatic hydrocarbon feedstocks often contain contaminants comprising bromine-reactive compounds including unsaturated hydrocarbons, such as mono-olefins, multi-olefins and styrenes, which can cause undesirable side reactions in these downstream processes. Therefore, these contaminants should be removed from the aromatic hydrocarbon feedstocks before they can be used in other processes.

Improved processes for aromatics production, such as that described in the Handbook of Petroleum Processing, McGraw-Hill, New York 1996, pp. 4.3-4.26, provide increased aromatics yield, but also increase the amount of contaminants. For example, the shift from high-pressure semi-regenerative reformers to low-pressure moving bed reformers results in a substantial increase in bromine-reactive components in the reformate streams, which are aromatic hydrocarbon feedstocks for downstream processes. This, in turn, results in a greater need for more efficient and less expensive methods for removal of bromine-reactive contaminants from aromatic hydrocarbon feedstocks, e.g., reformate streams.

Undesirable hydrocarbon contaminants containing olefinic bonds are quantified by the Bromine Index (BI). The number of grams of bromine absorbed by 100 grams of a hydrocarbon or a hydrocarbon mixture indicates the percentage of double bonds present. Thus, when the type and molecular weight is known, the contents of the olefin can be calculated. The Bromine Indices (i.e., numbers) of the hydrocarbon feeds and products are measured to determine the change in composition. Molecular sieves and clay treating have been used to reduce the Bromine Indices of various hydrocarbon products.

The treatment of hydrocarbons to remove olefinic materials from the hydrocarbons using clay catalysts is widely practiced in the petroleum and petrochemical industries One of the most common reasons for this treatment is to remove olefinic materials in order to meet various quality specifications. As used herein, the term "olefinic material" or "olefinic compound" includes both mono-olefins and multi-olefins. The term "mono-olefins" means olefinic compounds containing one carbon-carbon double bond per molecule. Examples of mono-olefins are ethylene, propylene, butenes, hexenes, and octenes. The term "multi-olefins" means olefinic compounds containing at least two carbon-carbon double bonds per molecule. Examples of multi-olefins are butadienes, cyclopentadienes, and isoprenes.

Olefinic compounds may be objectionable in aromatic hydrocarbons at even very low concentrations of less than a few parts per million by weight (wppm) for some processes. For example, in the manufacture of nitration grade aromatics including benzene, toluene and xylenes, it is essential to remove these olefinic materials from the feedstock.

Molecular sieves have been recently proposed as catalysts for removal of olefinic materials from hydrocarbon feedstocks. For example, U.S. Pat. No. 6,368,496 involves the removal of olefinic materials from an aromatic feed using an acid-active catalyst, such as a catalyst comprising a crystalline molecular sieve with ring structures of ten to twelve members or greater.

Molecular sieves catalysts have certain advantages over clay catalysts in the removal olefinic material from hydrocarbon feeds. For example, molecular sieves catalysts usually have a longer operating cycle than clay catalysts, which results in fewer catalyst change-outs and resultant equipment downtime. In addition, the longer operating cycle of molecular sieve catalyst results in the disposal of less catalyst waste. On the other hand, molecular sieve catalysts are considerably more expensive that clay catalysts. Therefore, it is important for economic viability, that molecular sieve catalysts used in the removal of olefinic material from hydrocarbon feeds, have good activity maintenance.

The present invention is directed to a process for removing bromine-reactive components from a hydrocarbon feed that utilizes a crystalline molecular sieve catalyst and has improved cycle length.

SUMMARY OF THE INVENTION

In accordance with the present invention, there is provided a process for reducing the Bromine Index of a hydrocarbon feed containing bromine-reactive contaminants that has improved cycle length and utilizes a crystalline molecular sieve catalyst. The process is carried out by contacting the hydrocarbon feed under conversion conditions with an acid-active catalyst shaped in the form of an elongated aggregate and comprising a crystalline molecular sieve having a MWW or *BEA framework type. The shortest cross-sectional dimension of the elongated aggregate is less than $\frac{1}{10}$ inch (2.54 millimeters).

BRIEF DESCRIPTION OF THE DRAWING

The FIGURE is a graph illustrating the results of the Example.

DETAILED DESCRIPTION OF THE INVENTION

Catalysts

The acid-active catalyst used in the process of the present invention comprises a crystalline molecular sieve having a MWW or *BEA framework type. These molecular sieves are described in detail in "Atlas of Zeolite Framework Types", eds. Ch. Baerlocher, W. H. Meier, and D. H. Olson, Elsevier, Fifth Revised Edition, 2001, which is hereby incorporated by reference. Examples of MWW and *BEA framework type molecular sieves include MCM-22, MCM-36, MCM-49, MCM-56, ITQ-1, SSZ-25, PSH-3, and Beta. Preferably, the molecular sieve is MCM-22, and, most preferably, the molecular sieve is aluminosilicate MCM-22.

The molecular sieve present in the catalyst will usually have an alpha value in the range of from about 100 to about 1000. The alpha value is a measure of molecular sieve acidic functionality and is described together with details of its measurement in U.S. Pat. No. 4,016,218 and in J. Catalysis, Vol. VI, pp. 278-287 (1966) and reference is made to these for such details. Higher alpha values correspond with a more active cracking catalyst.

The shortest cross sectional dimension of the elongated aggregate will be less than about 1/10 inch (2.54 millimeters). Preferably, the shortest cross sectional dimension of the aggregate will be from about 1/16 inch (1.59 millimeter) to about 1/50 inch (0.51 millimeter) and, more preferably, the shortest cross sectional dimension will be from about 1/20 inch (1.27 millimeter) to about 1/40 inch (0.635 millimeter).

The length of longest cross sectional dimension of the elongated aggregate will usually be 1.5 to about 4 times the length of the shortest cross sectional dimension of the aggregate. Preferably, the longest cross sectional dimension of the aggregate will be at about 2.5 to about 3.5 times the length of the shortest cross sectional dimension of the aggregate. Thus, in the case of an elongated aggregate having a shortest cross sectional dimension of 1/16 inch (1.59 millimeters) and a longest cross sectional dimension of 2.5 to about 3.5 times the length of the shortest cross sectional dimension of the aggregate, the longest cross sectional dimension of the aggregate will be from 5/32 inch (3.97 millimeters) to 7/32 inch (5.56 millimeters). Examples of specific elongated aggregate suitable for use in the present invention include aggregate with dimensions of 1/20 inch (1.27 millimeter) by 3/20 inch (3.80 millimeter), aggregate with dimensions of 1/32 inch (0.79 millimeter) by 3/32 inch (2.38 millimeters). Formed particles sized at 14-40 mesh and formed particles sized at 60-200 mesh are also suitable for use in the present invention. Usually, the length of longest cross sectional dimension of the elongated aggregate will be from about 1/25 inch (1 millimeter) to about 2/5 inch (10 millimeters).

The aggregate is not limited to any particular shape. Thus, the form of the aggregate can be cylindrical, triangular, polylobed (e.g. trilobe, quadrulobe, etc.), rectangular, or other similar form. The aggregate may also contain a central hole lengthwise through the aggregate.

The aggregates can be prepared using procedures know to persons skilled in the art. One technique involves compositing the molecular sieve particles with binder material, e.g. amorphous binding material, to bind together the molecular sieve particles. Examples of amorphous binding material include alumina, silica, kaolinic clays, bentonites, montmorillonites, sepiolite, and attapulgite. The technique usually involves mulling a mixture of molecular sieve particles and amorphous binding material and then extruding the mixture to form extrudates. Another suitable technique for forming the aggregates involves spray drying an aqueous mixture containing molecular sieve crystals and amorphous binding material.

In one preferred embodiment, the aggregate does not contain significant amounts of amorphous binding material to bind together the molecular sieve particles. In this embodiment, the aggregate will usually contain less than 10 percent by weight, based on the weight of the molecular sieve, of amorphous binding material, more preferably will contain less than 5 percent by weight, and, most preferably, the aggregate is substantially free of amorphous binding material.

One procedure for preparing aggregate without significant amounts of amorphous binding material involves the preparation of self-bound aggregate. The expression "self-bound aggregate" means that the molecular sieve particles are compressed together, such as by extrusion, to form an aggregate, e.g., extrudate. The self-bound aggregate does not contain amorphous binder material in order to bind together the particles of molecular sieve. Methods for preparing self-bound aggregates are described in U.S. Pat. Nos. 4,582,815 and 4,872,968. A procedure for preparing binder-free aggregate comprises the steps of: (a) mulling and then extruding a mixture comprising water, molecular sieve, sodium ions and no intentionally added binder material under conditions sufficient to form an aggregate having an intermediate green strength sufficient to resist attrition during ion exchange step (b) set forth hereinafter; (b) contacting the uncalcined aggregate of step (a) with an aqueous solution comprising ammonium cations under conditions sufficient to exchange cations in the molecular sieve with ammonium cations; (c) calcining the ammonium exchanged aggregate of step (b) under conditions sufficient to generate the hydrogen form of the molecular and increase the crush strength of the aggregate.

Another procedure for preparing the aggregates without significant amounts of amorphous binding material involves binding molecular sieve core particles with particles of a second molecular sieve. Procedures for preparing these molecular sieve-bound molecular sieve catalysts are described in U.S. Pat. No. 5,993,642, which is hereby incorporated by reference. An example of such a procedure comprises forming core crystals of a first molecular sieve molecular sieve having a MWW or *BEA framework type, mixing amorphous material, e.g., silica, with the core crystals, extruding a mixture of amorphous material and the core crystals to form an extrudate, and then converting the amorphous material to binder crystals of a second molecular sieve. The framework type of the second molecular sieve can be the same or can be different from the framework type of the first molecular sieve. The relative proportions of core crystals to binder crystals in the extrudate may vary widely, usually from 10 to 90 weight percent.

In many applications, the catalyst will have a surface to volume ratio of about 50 inch$^{-1}$ to 600 inch$^{-1}$ (19.7 cm$^{-1}$ to 236.2 cm$^{-1}$), and preferably 100 inch$^{-1}$ to 550 inch$^{-1}$ (39.4 cm$^{-1}$ to 216.5 cm$^{-1}$). Producing a catalyst with the desired surface to volume ratio can be achieved by controlling the particle size of the catalyst or by using a shaped catalyst particle, such as the grooved cylindrical aggregate described in U.S. Pat. No. 4,328,130 or a hollow or solid polylobal aggregate as described in U.S. Pat. No. 4,441,990, the entire contents of both of which are incorporated herein by reference. For example, a cylindrical catalyst particle having a diameter of 1/32 inch (0.79 millimeter) and a length of 3/32 inch (2.38 millimeters) has a surface to volume ratio of 141 inch$^{-1}$ (55.5 cm$^{-1}$) whereas a quadralobed solid aggregate having the external shape disclosed in FIG. 4 of U.S. Pat. No. 4,441,990 and having a maximum cross-sectional dimension of 1/16 inch (1.59 millimeters) and a length of 3/16 inch (4.76 millimeters) has a surface to volume ratio of 128 inch$^{-1}$ (50.4 cm$^{-1}$). A hollow tubular aggregate having an external diameter of 1/10 inch (2.54 millimeters), an internal diameter of 1/30 inch (0.85 millimeter) and a length of 3/10 inch (7.62 millimeters) has a surface to volume ratio of 136 inch$^{-1}$ (53.5 cm$^{-1}$). Methods for measuring surface area and volume are known to persons skilled in the art. Prior to making the determination, the measurement procedure should be standardized such that it results in a surface to volume ratio of 141 inch$^{-1}$ (55.5 cm$^{-1}$) for a cylindrical catalyst particle having a diameter of 1/32 inch (0.79 millimeter) and a length of 3/32 inch (2.38 millimeters).

The aggregates present in the catalyst can be formed from larger size aggregates by crushing the aggregates into pieces having the desired size.

While not intending to be limited to any theory of operation, it is believed that the reaction to reduce bromine reactive contaminants in a hydrocarbon feed is sensitive to intraparticle (macroporous) diffusion limitations. By selecting the size (and preferably shape) of the particles of the catalyst, it is believed that the intraparticle diffusion distance can be decreased without excessively increasing the pressure drop across the catalyst bed. As a result, the activity and stability of the catalyst are increased. Thus, with respect to cylindrical elongated aggregates having a diameter of 1/20 inch (1.27 millimeters), the maximum diffusion distance is 1/40 inch (0.635 millimeters).

Diffusion constants for complex mixtures in microporous catalysts remain difficult to calculate. The absence or presence of benefits by reducing catalyst aggregate size is therefore surprising. In the case of the present invention, both conventional clay and molecular sieve catalysts have far higher activity than necessary at the start of the cycle. Improving activity is therefore not an incentive to reduce aggregate size. The molecular sieve catalyst used in the present invention is between 10 and 100 times more expensive to produce than the clay catalysts presently used commercially. Reducing molecular sieve catalyst size increases molecular sieve losses during loading, unloading, and regeneration. Minimizing molecular sieve catalyst losses provides an incentive to use larger catalyst particle size. The inventors of the present invention have surprisingly discovered that reducing molecular sieve catalyst particle size improves the stability of the resulting catalyst. Predicting catalyst stability of molecular sieve catalysts in commodity petrochemical processes is much more difficult than predicting catalyst activity. Persons skilled in the art of this technology would have no reason to expect improved catalyst stability as a result of reducing the catalyst particle size.

The catalyst used in the present invention can be a fresh catalyst, a used catalyst, or a regenerated catalyst. The expression "fresh catalyst" means that the catalyst has not been exposed to hydrocarbon conversion conditions for a substantial amount of time, such as 24 hours. The expression "used catalyst" means that the catalyst has sufficient catalytic activity for use in the process of the present invention but its catalytic activity is lower than the corresponding fresh catalyst because it has been exposed to hydrocarbon feedstocks under conversion conditions. The expression "regenerated catalyst" means that the catalyst has been treated to restore sufficient catalytic activity.

Typical conditions used to regenerate the catalyst include a temperature range of about 30 to 900° C., a pressure range of about 10 to 20000 kpa-a, and a WHSV from about 0.1 $hr^{-1}$ to about 1000 $hr^{-1}$, wherein the regenerating conditions comprise a feed having an oxidative reagent such as air, oxygen, and nitrogen oxides.

The feed can be contacted with a hydrotreating catalyst prior to contacting with acid-active catalyst to substantially to convert multi-olefins to oligomers. The hydrotreating catalyst has a metal component, usually a metal component selected from the group consisting of: nickel, cobalt, chromium, vanadium, molybdenum, tungsten, nickel-molybdenum, cobalt-nickel-molybdenum, nickel-tungsten, cobalt-molybdenum and nickel-tungsten-titanium. The support for the catalyst is conventionally a porous solid, usually alumina, or silica-alumina but other porous solids such as magnesia, titania or silica, either alone or mixed with alumina or silica-alumina may also be used, as convenient. A preferred hydrotreating catalyst is a nickel molybdenum/alumina.

In addition, the feed can also be clay treated either before or after contact with the acid-active catalyst to substantially convert multi-olefins to oligomers. In one embodiment, the acid-active catalyst and clay catalyst are located in a single reactor vessel. In this embodiment, the hydrocarbon feed can contact the acid-active catalyst either before or after contacting the clay. Further, the clay catalyst and the acid-active catalyst can be a mixture and the hydrocarbon feed contacts both the clay and the acid-active catalyst at the same time. In another embodiment, the acid-active catalyst and clay catalyst are located in separate reactor vessels. In this embodiment, the hydrocarbon feed can contact the acid-active catalyst either before or after contacting the clay. If the feed is treated with clay, the amount of clay utilized will usually be an amount in the range of from about 25 to about 75 percent by weight based on the weight of the acid-active catalyst.

The term "clay" as used herein, means an aggregate of hydrous silicate particles, preferably less than 4 micrometers in diameter. It consists of small crystals of the minerals silica ($SiO_2$) and alumina ($Al_2O_3$), which is substantially free of the type of the porosity characteristic of a molecular sieve (4-10 Ångmicropores). The clay is usually an acidic naturally-occurring clay or a synthetic clay material. Clays suitable use include any of those used in processing hydrocarbons. Examples of suitable clays include kaolinite, bentonite, attapulgite, and montmorillonite clay. A preferred commercially available clay is F-24 grade clay, which is available from Engelhard Corp.

Feed Pretreatment

The hydrocarbon feed used in the process of the present invention may contain nitrogen-containing or sulfur-containing impurities that can reduce the cycle length of the catalyst. These impurities are preferably at least partially removed from the hydrocarbon feed before contacting the feed with the catalyst used in the process of the present invention. The feed may be subjected to chemical processes, such as, distillation, fractionation, adsorption, drying, inert gas purging, or pretreatment processes (e.g., distillation, fractionation, water washing, adsorption, drying, inert gas purging, or catalytic reactions) to remove at least a portion of the impurities. For example, the hydrocarbon feed can be contacted with an absorbent under absorption conditions effective to remove at least a portion of such nitrogen-containing or sulfur-containing impurities. Examples of suitable absorbents include clay materials such as the clay materials previously described herein or an alumina compounds ($Al_2O_3$), such as Selectsorb that may be obtained from Moltan Sorbent Technologies. Preferred absorption conditions include a temperature of from ambient to 500° C., more preferably from ambient to 200° C., or most preferably from ambient to 100° C.; a pressure sufficient to maintain liquid phase conditions; a weight hourly space velocity from 0.5 $hr^{-1}$ to about 100 $hr^{-1}$, more preferably from about 0.5 $hr^{-1}$ to about 10 $hr^{-1}$, most preferably from 1.0 $hr^{-1}$ to 4.0 $hr^{-1}$ depending on the hydrocarbon feed being treated.

Feed

A wide variety of hydrocarbon feedstocks can be used in the practice of the invention. Examples of suitable hydrocarbon feedstocks include aromatic streams obtained from reforming and cracking processes. These feedstocks can include a wide variety of hydrocarbons, e.g., paraffins, aromatics, and bromine-reactive compounds such as olefins. Usually aromatic hydrocarbon feedstocks include mononuclear aromatic hydrocarbons and undesirable olefins including mono-olefins, multi-olefins, and styrene, which have an initial BI from about 100 to about 3000.

Because the exact nature of the unsaturated hydrocarbons may vary and may even be unknown, indirect methods of measuring the unsaturated hydrocarbons are typically used. One well-known method of measuring trace amounts of unsaturated hydrocarbons is the BI. The measurement of BI is described in detail in ASTM D2710-92, the entire contents of which are incorporated herein by reference. The BI indirectly measures the olefin content of aromatic containing hydrocarbon samples using potentiometric titration. Specifically, the BI is defined as the number of milligrams of bromine consumed by 100 grams of hydrocarbon sample under given conditions.

The aromatics include, for example, benzene, toluene, xylene, ethylbenzene, cumene and other aromatics derived, e.g., from reformate. Reformate is separated by distillation into light reformate (mostly benzene and toluene), and heavy reformate (including toluene, ortho-, meta- and para-xylenes and other heavier aromatics such as $C_9+$). After extraction, the aromatic feedstream typically contains greater than about 98 wt. % benzene and toluene and wppm levels of extraction solvents. Heavy reformate feedstocks typically contain less than about 0.5 wt. % toluene and less than about 250 wppm benzene. Some aromatic streams such as heavy reformate derived from semi-regen and CCR reforming processes contain multi-olefins as they emerge from the processing.

The amount of multi-olefins in a hydrocarbon feedstock may vary from less than 10 wt. %, preferably less than 1 wt. %, more preferably less than 500 wppm depending on the source of feedstock and any pre-treatment. Extracted benzenes and heavy reformates typically contain less than about 1000 wppm multi-olefins.

The hydrocarbon feedstocks to be processed according to the invention contain bromine-reactive hydrocarbon compounds from about 0.001 to about 10 wt. %, preferably from about 0.001 to about 1.5 wt. %, more preferably from about 0.005 to about 1.5 wt. % or a BI from about 2 to about 20000, preferably from about 2 to about 3000, more preferably from about 10 to about 3000 or most preferably at least 5.

The hydrocarbon feedstock processed according to the present invention will have a lower BI than the initial BI of the hydrocarbon feedstock. Usually after treatment, the BI will be no greater than 50% of the BI value before treatment of hydrocarbon feedstock. Preferably, the BI value will be no greater than 30%, and, more preferably, the BI will be no greater than 20%.

Because of the longer cycle-length of the molecular sieve catalyst, the present invention can usually process hydrocarbon feeds (reduce BI) for longer times between catalyst change out. The term "cycle-length" means the on-oil time of the catalyst before change-out or regeneration.

The present invention usually has a hydrocarbon feed flowrate of at least 10 kg per day, preferably more than at least 100 kg per day, more preferably at least 200 kg per day.

Process Conditions

The process of the present invention is carried out under conditions effective in the remove multi-olefins and mono-olefins from hydrocarbon feed. Exemplary conversion conditions include a temperature of from about 38° C. (100° F.) to about 538° C. (1000° F.), preferably 93° C. (200° F.) to about 371° C. (700° F.), more preferably 93° C. (200° F.) to about 316° C. (600° F.), to a pressure of from about 136 kPa-a (5 psig) to about 13891 kPa-a (2,000 psig), preferably from about 205 kPa-a (15 psig) to about 6996 kpa-a (1000 psig), more preferably from about 205 kPa-a (15 psig) to about 3549 kpa-a (500 psig), a weight hourly space velocity (WHSV) from about 0.1 $hr^{-1}$ and about 200 $hr^{-1}$, preferably from about 1 $hr^{-1}$ and about 100 $hr^{-1}$, more preferably from about 2 $hr^{-1}$ and about 50 $hr^{-1}$. The WHSV is based on the total weight of catalyst, i.e., the total weight of active catalyst plus any binder that is used.

In some embodiments, this disclosure relates to:

Paragraph 1. A process for reducing the Bromine Index of a hydrocarbon feed containing bromine-reactive contaminants, the process comprising:

contacting the hydrocarbon feed under conversion conditions with an acid-active catalyst shaped in the form of an elongated aggregate and comprising a crystalline molecular sieve having a MWW or *BEA framework type;

wherein the shortest cross-sectional dimension of the elongated aggregate is less than 1/10 inch (2.54 millimeters).

Paragraph 2. The process as recited in Paragraph 1, wherein the length of the longest cross sectional dimension of the elongated aggregate is in the range of from about 1/25 (1 millimeter) to about 2/5 inch (10 millimeters).

Paragraph 3. The process of Paragraph 1 or 2, wherein the catalyst has a surface to volume ratio of from about 50 $inch^{-1}$ to about 600 $inch^{-1}$ (19.7 $cm^{-1}$ to 236.2 $cm^{-1}$).

Paragraph 4. The process as recited in any preceding paragraph, wherein the molecular sieve is selected from the group consisting of MCM-22, MCM-36, MCM-49, and MCM-56.

Paragraph 5. The process as recited in any preceding paragraph, wherein the shortest cross sectional dimension of the elongated aggregate is from about 1/16 inch (1.59 millimeter) to about 1/50 inch (0.51 millimeter).

Paragraph 6. The process as recited in any preceding paragraph, where the longest cross sectional dimension of the elongated aggregate is from about 1.5 to about 4 times the length of the shortest cross sectional dimension of the elongated aggregate.

Paragraph 7. The process as recited in Paragraph 6, wherein the shortest cross sectional dimension of the elongated aggregate is from about 1/20 inch (1.27 millimeter) to about 1/40 inch (0.635 millimeter).

Paragraph 8. The process as recited in any preceding paragraph, where the elongated aggregate has a quadralobe cross-section.

Paragraph 9. The process as recited in Paragraphs 1 to 7, where the elongated aggregate has a cylindrical cross-section.

Paragraph 10. The process as recited in any preceding paragraph, wherein the elongated aggregate comprises amorphous binding material.

Paragraph 11. The process as recited in Paragraph 1-9, wherein the elongated aggregate contains less than 10 percent by weight based on the weight of the molecular sieve of amorphous binding material.

Paragraph 12. The process as recited in Paragraph 11, wherein the elongated aggregate is self-bound aggregate.

Paragraph 13. The process as recited in Paragraph 11, wherein the elongated aggregate is a molecular sieve-bound molecular sieve.

Paragraph 14. The process as recited in any preceding paragraph, wherein the Bromine Index of the hydrocarbon feed is reduced by at least 50 percent.

Paragraph 15. The process as recited in any preceding paragraph, further comprising a step of contacting the hydrocarbon feedstock with a hydrotreating catalyst under hydrotreating conditions.

Paragraph 16. The process as recited in any preceding paragraph, wherein the hydrocarbon feed has a multi-olefin level of less than 500 wppm.

Paragraph 17. The process as recited in any preceding paragraph, further comprising a step of contacting the hydrocarbon feedstock with a clay catalyst.

Paragraph 18. The process as recited in any preceding paragraph, wherein the hydrocarbon feedstock has a Bromine Index of at least 5.

Paragraph 19. The process as recited in any preceding paragraph, wherein the Bromine Index is reduced by at least 50 percent.

Paragraph 20. The process as recited in any preceding paragraph, wherein the hydrocarbon feed is an aromatic stream.

Paragraph 21. The process as recited in any preceding paragraph, wherein the conversion conditions comprise a temperature range from about 38° C. to about 538° C., a pressure range from about 136 kpa-a to about 13891 kpa-a, and a WHSV from about 0.1 $hr^{-1}$ to about 200 $hr^{-1}$.

Paragraph 22. The process as recited in any preceding paragraph, wherein the molecular sieve is MCM-22.

Paragraph 23. The process as recited in any preceding paragraph, wherein the elongated aggregate is an elongated aggregate having a cylindrical cross-section with a diameter of about 1/32 inch (0.79 millimeter) or a formed elongated aggregate sized at 60-200 mesh.

Paragraph 24. The process as recited in any preceding paragraph, wherein the acid-activated catalyst is a regenerated acid-activated catalyst.

The following example illustrates the invention:

EXAMPLE

A heavy reformate with a BI of 550 was used as a feed for the test. The heavy reformate was a $C_7$+ cut of full-range cyclic catalytic reformer ("CCR") reformate containing 39 wt. % toluene, 40 wt. % $C_8$+ aromatics, 20 wt. % $C_9$+ aromatics, and 0.33 wt. % olefins. No dienes were detected in this feed using standard gas chromatograph ("GC") analysis. The feed was processed at conditions of 190° C. and 1823 kpa-a (250 psig) over self-bound MCM-22 aggregates having different sizes.

The results shown in the FIGURE show that aggregates with a shortest cross sectional dimension of less than 1/12 inch (1/20 inch quadrulobe aggregate, 1/32 inch (0.79 millimeter) cylindrical aggregate, 14-40 mesh aggregate, and 60-200 mesh aggregate) had higher activity for olefin conversion than aggregates with a shortest cross sectional dimension of greater than 1/10 inch (1/8 inch cylindrical aggregate). For the same amount of olefins, aggregates with a shortest cross sectional dimension of less than 1/12 inch (1/20 inch quadrulobe aggregate, 1/32 inch (0.79 millimeter) cylindrical aggregate, 14-40 mesh aggregate, and 60-200 mesh aggregate) required less contact times than aggregates with a shortest cross sectional dimension of greater than 1/10 inch (1/8 inch cylindrical aggregate). We believe, therefore, that aggregates with a shortest cross sectional dimension of less than 1/12 inch (1/20 inch quadrulobe aggregate, 1/32 inch (0.79 millimeter) cylindrical aggregate, 14-40 mesh aggregate, and 60-200 mesh aggregate) have longer cycle length than aggregates with a shortest cross sectional dimension of greater than 1/10 inch (1/8 inch cylindrical aggregate).

What is claimed is:

1. A process for reducing the Bromine Index of a hydrocarbon feed containing bromine-reactive contaminants, comprising contacting said hydrocarbon feed under conversion conditions including 1/WHSV of between 0.002 and 0.004 with a catalyst comprising 60-200 mesh MCM-22 formed by crushing aggregate.

2. The process of claim 1, wherein said hydrocarbon feed is a heavy reformate feed.

3. The process of claim 1, wherein the MCM-22 is self-bound.

* * * * *